United States Patent
Buczolits et al.

(10) Patent No.: US 10,470,469 B2
(45) Date of Patent: Nov. 12, 2019

(54) EXCHANGEABLE CREAM COATING HEAD

(71) Applicant: HAAS FOOD EQUIPMENT GMBH, Vienna (AT)

(72) Inventors: Peter Buczolits, Stockerau (AT); Johannes Haas, Vienna (AT); Josef Haas, Leobendorf (AT); Stefan Jiraschek, Koenigsbrunn (AT); Juergen Reithner, Schoenberg Am Kamp (AT); Leopold Schiessbuehl, Goellersdorf (AT); Gerhard Schuhleitner, Limberg (AT)

(73) Assignee: Haas Food Equipment GmbH, Vienna (AU)

( * ) Notice: Subject to any disclaimer, the term of this patent is extended or adjusted under 35 U.S.C. 154(b) by 406 days.

(21) Appl. No.: 15/309,273

(22) PCT Filed: May 6, 2015

(86) PCT No.: PCT/EP2015/059938
§ 371 (c)(1),
(2) Date: Nov. 7, 2016

(87) PCT Pub. No.: WO2015/169846
PCT Pub. Date: Nov. 12, 2015

(65) Prior Publication Data
US 2017/0064968 A1 Mar. 9, 2017

(30) Foreign Application Priority Data

May 7, 2014 (AT) ...................... 336/2014

(51) Int. Cl.
A21C 9/04 (2006.01)
A23G 3/22 (2006.01)
A21C 15/00 (2006.01)

(52) U.S. Cl.
CPC .............. *A21C 15/002* (2013.01); *A21C 9/04* (2013.01); *A23G 3/22* (2013.01)

(58) Field of Classification Search
CPC ......... A23P 20/12; A21C 9/04; A21C 15/002; A23G 3/22; A23G 3/2092
USPC ..... 99/494, 450.1, 487, 516; 118/13, 23, 24, 118/707
See application file for complete search history.

(56) References Cited

U.S. PATENT DOCUMENTS

| 3,774,905 A | 11/1973 | Williams | |
| 4,032,667 A * | 6/1977 | Kreuter | A23G 3/22 118/24 |
| 4,045,584 A * | 8/1977 | Jones | A21C 9/04 118/24 |

(Continued)

FOREIGN PATENT DOCUMENTS

| CN | 101648176 A | 2/2010 |
| CN | 202316229 U | 7/2012 |

(Continued)

*Primary Examiner* — Reginald Alexander
(74) *Attorney, Agent, or Firm* — Laurence A. Greenberg; Werner H. Stemer; Ralph E. Locher

(57) ABSTRACT

A cream coating head, an apparatus and a system for applying a pumpable mass onto a carrier body include a detachable coupling system. The coupling system is provided for coupling and decoupling the cream coating head to or from a conveying apparatus.

20 Claims, 4 Drawing Sheets

(56) References Cited

U.S. PATENT DOCUMENTS

| | | | | |
|---|---|---|---|---|
| 4,496,084 A | * | 1/1985 | Booth | A23P 20/12 |
| | | | | 118/17 |
| 4,715,315 A | * | 12/1987 | Burford | A21C 15/002 |
| | | | | 118/25 |
| 4,801,097 A | | 1/1989 | Fitch, Jr. | |
| 6,510,809 B2 | * | 1/2003 | Kuenen | A23P 20/12 |
| | | | | 118/13 |
| 6,616,963 B1 | | 9/2003 | Zerby et al. | |
| 2006/0090654 A1 | * | 5/2006 | Mange | A23G 3/0063 |
| | | | | 99/494 |

FOREIGN PATENT DOCUMENTS

| | | |
|---|---|---|
| CN | 202949918 U | 5/2013 |
| DE | 144931 C | 5/1902 |
| DE | 8014694 U1 | 10/1980 |
| DE | 3540619 C1 | 5/1987 |
| GB | 281789 A | 12/1927 |
| GB | 321414 A | 11/1929 |
| RU | 2300897 C2 | 6/2007 |

\* cited by examiner

EXCHANGEABLE CREAM COATING HEAD

BACKGROUND OF THE INVENTION

Field of the Invention

The invention relates to a cream coating head or an apparatus and a system containing a cream coating head, wherein the cream coating head is adapted and/or suitable for the metered dispensing and for application of a cream or other mass such as, for example, chocolate cream, caramel or jam to a carrier body such as, for example flat wafers moving on a conveying apparatus.

Cream coating heads are known in various designs. For example, coating stations are known for the production of wafer sheets with an applied cream film in particular for the manufacture of wafer blocks. In these coating stations a wafer sheet is transported substantially horizontally on a transport surface. A cream coating head is provided above the conveying surface. This cream coating head is connected to the machine frame of the conveying apparatus in a height-adjustable manner according to the prior art. The cream coating head according to the prior art comprises a container into which a cream can be poured. Furthermore, the cream coating head comprises rollers between which a cream gap is provided. Through this cream gap a cream ribbon or a cream film can be dispensed. This cream ribbon or this cream film is, for example, 80 cm wide and has a thickness of 1 to 8 mm. Through the cream gap a cream ribbon can be applied to a plurality of consecutively arranged wafer sheets in order to produce wafer sheets with an applied cream film. A disadvantage with this structure is that the retrofitting expense when changing the cream or changing the product is very high. Thus, the entire installation must be stopped, and the coating station must be cleaned so that no residue of the previously used cream remains in the cream head. Only then can the new cream be poured in. The long stoppage of the system is undesirable in the industrial production of edible products such as, for example, wafer blocks.

BRIEF SUMMARY OF THE INVENTION

It is now the object of the invention to provide a cream coating head and a apparatus comprising a cream coating head and a conveying apparatus which overcome the disadvantages of the prior art. This comprises in particular that a rapid change of product or a rapid change of different creams is possible. It further comprises the fact that the production plant must be stopped for the shortest possible time for cleaning the cream coating head.

The object according to the invention is solved in particular by the features of the independent patent claims.

The invention relates in particular to a cream coating head for dispensing and for application of a cream or a mass, such as in particular a chocolate cream, to a carrier body, such as in particular a flat wafer moving on a conveying apparatus, to form an intermediate product such as wafer sheets with an applied cream film to produce edible products such as in particular wafer blocks, comprising a cream container for receiving the cream to be dispensed, an elongate cream gap for dispensing a cream ribbon which in particular is configured as a cream film, which is characterized in that a coupling arrangement is provided for coupling the cream coating head to the conveying apparatus.

Optionally it is provided that the coupling arrangement comprises one or more centring means for centring and fixing the position of the cream coating head with respect to the conveying apparatus.

Optionally it is provided that the coupling arrangement comprises a connector for transferring electrical energy and/or electrical signals.

Optionally it is provided that the coupling arrangement comprises a medium connector for connection to a medium line such as in particular a compressed air line or a liquid line, wherein the medium connector is a sealing medium connector for connection of two lines such as in particular two compressed air lines or two liquid lines and wherein optionally a valve is provided.

Optionally it is provided that the cream coating head comprises a self-supporting cream coating head frame to which the components of the cream coating head are connected so that the cream coating head can be separated and removed in a modular fashion from the conveying apparatus.

Optionally it is provided that the centring means, the connector or connectors and optionally the medium connector or connectors all have the same plug-in direction so that the centring means, the connector or connectors and the medium connector or connectors can be connected to their respective connection partners by plugging-on and in particular by placing the cream coating head onto the conveying apparatus.

The invention in particular relates to an apparatus for applying a pumpable mass onto a carrier body comprising a cream coating head, a conveying apparatus for conveying the carrier body or the carrier bodies, having a machine frame on which a driven conveying means such as, for example a conveyor belt or a belt conveyor is provided and this is preferably designed to be standing on the ground, characterized in that a detachable coupling system is provided for coupling and decoupling the cream coating head to or from the conveying apparatus.

Optionally it is provided that the coupling system comprises one or more centring means for centring and fixing the position of the cream coating head with respect to the conveying apparatus, wherein the centring means each comprise two connection partners which can be connected to one another or separated from one another along a plug-in direction, and wherein one connection partner is preferably permanently connected to the conveying apparatus and the other connection partner is preferably permanently connected to the cream coating head.

Optionally it is provided that the coupling system comprises a connector for transferring electrical energy and/or electrical signals, wherein the connector comprises two connection partners which can be connected to one another or separated from one another along a plug-in direction, and wherein one connection partner is preferably permanently connected to the conveying apparatus and the other connection partner is preferably permanently connected to the cream coating head.

Optionally it is provided that the coupling system comprises a medium connector for connection to a medium line such as in particular a compressed air line or a liquid line, wherein the medium connector is a sealing medium connector for connection of two lines such as in particular two compressed air lines or two liquid lines, wherein the medium connector comprises two connection partners which can be connected to one another or separated from one another along a plug-in direction, and wherein one connection partner is preferably permanently connected to the conveying apparatus and the other connection partner is preferably permanently connected to the cream coating head.

Optionally it is provided that the centring means, the connector or connectors and optionally the medium connector or connectors are provided in a predetermined arrangement on the cream coating head and on the conveying apparatus, that the centring means, the connector or connectors and optionally the medium connector or connectors all have the same plug-in direction so that the centring means, the connector or connectors and optionally the medium connector or connectors can be connected to their respective connection partners in particular for plugging-on or placement of the cream coating head on the conveying apparatus and a ready-to-operate connection is made between the cream coating head and the conveying apparatus.

Optionally it is provided that the plug-in direction runs transversely to the conveying surface of the conveying apparatus and in particular the conveying means, that the plug-in direction runs normally to the conveying surface of the conveying apparatus and in particular the conveying means and/or that the plug-in direction runs substantially vertically or perpendicular so that a cream coating head disposed above a conveying surface can be raised or is raisable upwards.

Optionally it is provided that the coupling system is a coupling system which can be mounted without tools, in particular which can be separated and connected without tools.

Optionally it is provided that a locking apparatus is provided for locking the cream coating head to the conveying apparatus.

Optionally the invention relates to a system comprising an apparatus according to the invention and at least two cream coating heads according to the invention, wherein both cream coating heads can be alternately plugged onto the apparatus so that preferably one cream coating head can be separated and removed from the apparatus and the second cream coating head can be connected to the apparatus immediately thereafter, in particular at the same place.

Optionally it is provided that the cream coating head can be simply separated from the conveying apparatus. Subsequently a second cream coating head can be connected to the conveying apparatus. This exchangeability of the cream coating head ensures that the installation need only be stopped very briefly. For example, the newly supplied cream coating head can already be a cleaned cream coating head. Optionally the newly supplied cream coating head can be a cream coating head for supplying a different cream. The originally provided cream coating head which is separated from the conveying apparatus can be maintained, re-filled or cleaned independently of the production process whilst another cream coating head is connected to the system.

Preferably the cream coating head in all embodiments is configured in such a manner that by simply plugging on or putting on or onto the conveying apparatus, said cream coating head is connected to said apparatus. In particular, the cream coating head can be connected to the conveying apparatus by simply plugging-on or placing-on. In this case the cream coating head is preferably already ready to use or ready to operate with the conveying apparatus by simply placing-on or plugging-on.

In practice this means that the cream coating head can be transported, for example, by means of a pallet wagon or a crane device to the conveying apparatus. In a subsequent step the cream coating head is plugged on or onto the conveying apparatus. This plugging-on includes, for example, that centring means are plugged into one another, that connectors for the transmission of electrical energy or electrical signals are plugged together and/or that medium connectors for connection of medium lines such as, for example compressed air lines or liquid lines are connected to one another. This plugging-on is for example a placement from above. Optionally the plugging-on is a multipart complex movement where, for example, a lateral sliding movement and then a plugging movement takes place. Optionally a locking device is provided, which brings about a locking of the cream coating head with the conveying apparatus.

Preferably the cream coating head is connected or can be connected to the conveying apparatus by simply placing from above. This connection comprises on the one hand the centring and thus the fixing of the desired position of the cream coating head with respect to the conveying apparatus and the connection of the connector and optionally the medium connector. In this embodiment, the cream head is connected to the conveying apparatus by simply placing-on so that the apparatus is in a ready-to-use or ready-to-operate state.

The cream coating head preferably has a self-supporting cream coating head frame. All the components of the cream coating head are preferably provided on this cream coating head frame. As a result of the self-supporting cream coating head frame and the components of the cream coating head connected to this frame, the cream coating head is configured in a modular fashion or as a changeable module. The cream coating head thus preferably forms an independent self-supporting module which, for example can be lifted by a pallet truck. Furthermore, this cream coating head configured as a module can be removed, cleaned, maintained etc. without needing to stop the system during these steps. For example, the mountings for cream rollers, drives for driving the cream rollers, further mountings, stiffening elements, scrapers and further elements can be provided on the self-supporting cream coating head frame.

Preferably the centring means, the connector or connections and optionally the medium connector or connectors are provided on the cream coating head frame. These are preferably arranged or connected rigidly to the cream coating head frame or invariably in their position with respect to the cream coating head frame. The centring means, connectors and/or medium connectors are thereby provided in a predetermined position on the cream coating head and/or the cream coating head frame. The respective connection partners of these components are preferably also provided in a predetermined position in each case rigidly or substantially immovably on the conveying apparatus. The positions of the connection partners of the conveying apparatus and on the coating head correspond to one another so that by simple placement all the provided centring means, connectors and/or medium connectors are connected or can be connected by placing the cream coating head on the conveying apparatus.

To this end, the centring means, the connectors and/or the medium connectors have a plug-in direction along which the connection partners can be connected to one another and/or along which the connection partners can be separated from one another. The plug-in direction preferably corresponds to that direction along which the cream coating head can be placed onto the conveying apparatus or that direction along which the cream coating head can be removed from the conveying apparatus. Preferably this plug-in direction runs substantially transversely to the conveying surface, normally to the conveying surface and/or perpendicular or vertically. As a result, a cream coating head disposed above the conveying surface can be removed or carried away by means of a lifting apparatus such as, for example, a pallet truck. The supply and placement are also preferably accomplished in this embodiment by simply placing from above.

Optionally a sufficient connection is made by the own weight of the cream coating head. Optionally a locking apparatus is provided in order to lock the cream coating head with the conveying apparatus. Optionally this locking apparatus is configured as a pneumatic locking device.

Optionally the complete cream coating head can be removed by means of a pallet truck and can be connected to the machine by the coupling system according to the invention.

Optionally the connection is made by simple positionally accurate placement of the cream coating head on the conveying apparatus. Here the centring means are used for centring the position of the cream coating head with respect to the conveying apparatus. Optionally in all embodiments the centring means also for example centre the connectors and optionally the medium connectors with respect to one another.

In all embodiments the centring means optionally have run-in slopes or conically or rounded configured extensions in order to facilitate the centring and the placing-on.

By placing the cream head on the conveying apparatus, this is preferably brought into a ready-to-use position in which for example all connections such as a mechanical connection, an electrical connection and/or a pneumatic connection are made. By supplying a structurally identical or suitable second cream coating head, a rapid change of product can thereby be made. The cleaning duration is also reduced. Furthermore, the cleaning can be performed substantially more thoroughly that with rigidly interconnected components.

Preferably a cream container is provided. This cream container is optionally removable or can be plugged on with the cream coating head so that this cream container can be removed simply, preferably without tools, from the cream coating head.

A lateral calibration or guidance of the wafer sheets can be provided in the conveying direction of the carrier body, in particular in the conveying direction of the supplied flat wafer sheets. This can be adjusted manually or for example by means of controlled or regulated drives. As a result, the cream application to the wafer sheet can be optimized and growing or shrinking wafer sheets can be generally influenced. This variation in the wafer sheet size occurs for example as a result of the variation in moisture. Preferably the length of the cream gap is adapted for this purpose so that an excess of cream is minimized and nevertheless the carrier body or bodies is or are coated with cream over the full surface.

The medium connectors or the medium lines are for example suitable and/or adapted for the supply of compressed air from the conveying apparatus to the cream coating head. For example, compressed air is used to adjust the calibrating meter or for a pneumatic roller seal.

Optionally the apparatus according to the invention and the cream coating head according to the invention comprise medium lines or a medium connector for supplying a liquid medium. This medium can, for example, be heated water or a heated fluid which for example is pumped through the cream coating rollers and in some cases through the cream container or the wall thereof in order to heat this. As a result the cream application for example can be improved.

Optionally connectors are provided to transmit electrical energy and/or electrical signals. For example, a drive for turning the cream rollers is provided. The current for this drive can be supplied for example via the connectors. Optionally a control device is provided. The control signals can be connected via the connectors for example to a controller of the system or to the controller of the conveying apparatus.

Thus, in the present apparatus optionally one or more connectors, one or more medium connectors and/or one or more centring means exist. These can be arranged adjacent to one another. Preferably all these connectors and centring means have the same plug-in direction.

The cream coating head can optionally comprise axes of rotation of the cream shafts arranged rigidly with respect to one another. These axes of the cream shafts correspond to the axes of rotation of the cream shafts or the cream rollers. As a result of the, in some cases, rigid arrangement of the axes with respect to one another, the distance or the cream gap between the cream rollers is substantially invariable. However, according to one preferred embodiment, a calibrating meter can be provided. This calibrating meter corresponds to a plate-shaped or beam-shaped body which is optionally pointed in the direction of the cream gap. This calibrating meter preferably runs along the entire cream gap. By moving the calibrating meter, the thickness of the cream gap can be varied in order, for example, to be able to adjust the thickness of the dispensed cream ribbon or the cream film. The movement or adjustment of the calibrating meter can be accomplished manually or optionally by means of a drive. For example, in all embodiments cream thicknesses of 0.5 to 10 mm can be achieved as a result. Preferably a cream thickness or a ribbon thickness of 0.8 to 8 mm can be achieved. As a result of this rigid arrangement of the axes of rotation with respect to one another, the cream film width or the length of the cream gap can be adjusted exactly. In particular, the cream gap can be sealed by laterally, for example, pneumatically pressed-on sealing plates, optionally with insertion wedges without a cream fraction being able to enter into the mounting or into the drive train of the cream rollers. Optionally the calibrating meter is moved to vary the thickness of the cream gap for example in the tangential direction of the cream rollers. Optionally the calibrating meter is inclined to vary the thickness of the cream gap and in particular is inclined by a straight line which runs parallel to the axes of the cream shafts.

The rotational speed of the coating head can optionally be varied and adapted. Optionally the distance of the coating heat to the wafer sheet can be adapted and varied.

The invention is described further hereinafter with reference to specific exemplary embodiments.

DESCRIPTION OF THE INVENTION

Figure 1:
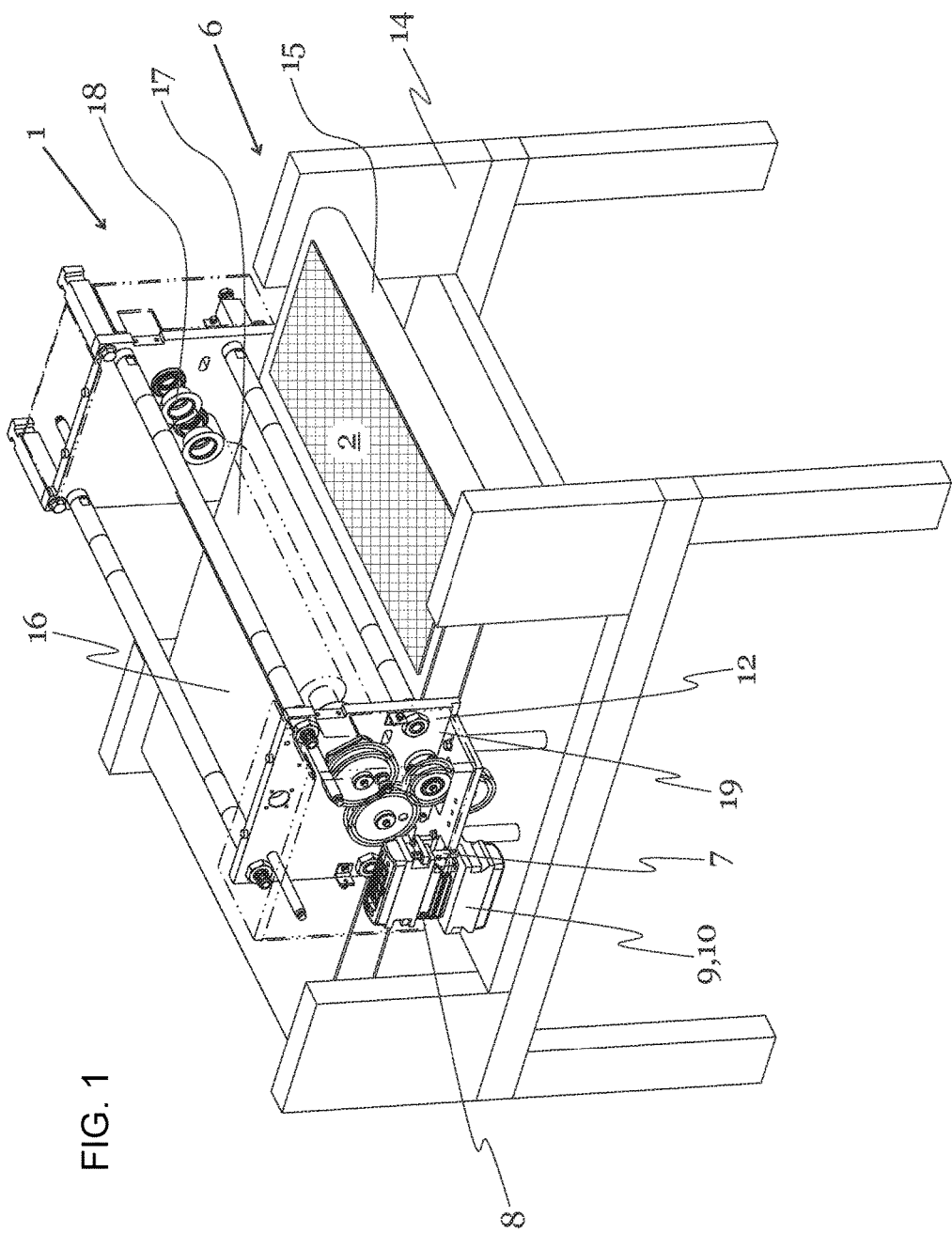
FIG. 1 shows an oblique view of an apparatus according to the invention or a cream coating head according to the invention in an exemplary schematic view.

FIG. 1 shows an apparatus according to the invention comprising a cream coating head 1 as well as a conveying apparatus 6. Carrier bodies 2 can be transported on the conveying apparatus 6. Preferably the carrier bodies 2 are passed consecutively edge to edge by the cream coating head 1. The cream coating head 1 is adapted to dispense a cream. This cream is dispensed in the form of a cream ribbon or a cream film. Preferably the width of the dispensed ribbon corresponds to the dimension of the carrier body 2 so that this can be coated or covered extensively with cream. The thickness of the cream layer or the cream ribbon or the cream film is preferably between 0.8 and 8 mm.

The cream coating head 1 comprises a cream coating head frame 12. Preferably all the elements of the cream coating head 1 are provided on this cream coating head frame 12. For example, the cream rollers 17 are connected to the cream coating head frame 12 by means of bearings 18. The cream coating head frame 12 is preferably self-supporting with the result that the entire cream coating head 1 can be removed as a unit or as a module from the conveying apparatus 6. Preferably also the coupling system 8 containing, for example, centring means 7, connectors 9 and optionally medium connectors 10 is also disposed on the cream coating head frame 12. The arrangement of these connectors 9 or centring means 7 is configured in such a manner that by simply plugging or pushing the cream coating head 1 onto the conveying apparatus 6, the connection of these components is made. The conveying apparatus 6 comprises a machine frame 14. This machine frame 14 is preferably also self-supporting and optionally designed to stand on the floor. Preferably at least one conveying means 15 with a conveying surface 16 is provided on the machine frame 14. The conveying means 15 is for example a belt conveyor with an endless conveyor belt or a belt conveyor. Optionally other conveying means are also provided. The carrier bodies 2 are transported on the conveying surface 16 and provided with a cream in the region of the cream coating head 1.

Preferably the centring means 7, the connectors 9 and optionally the medium connectors 10 have a plug-in direction 13. The plug-in direction 13 is that direction along which the said components can be plugged together and separated from one another. Preferably the plug-in direction 13 of all the centring means 7, connectors 9 and optionally medium connectors 10 is the same. The plug-in directions 13 of these components therefore all run substantially parallel. As a result, the connection of all the components can be made by simply plugging the cream coating head 1 onto the conveying apparatus 6.

Figure 2:
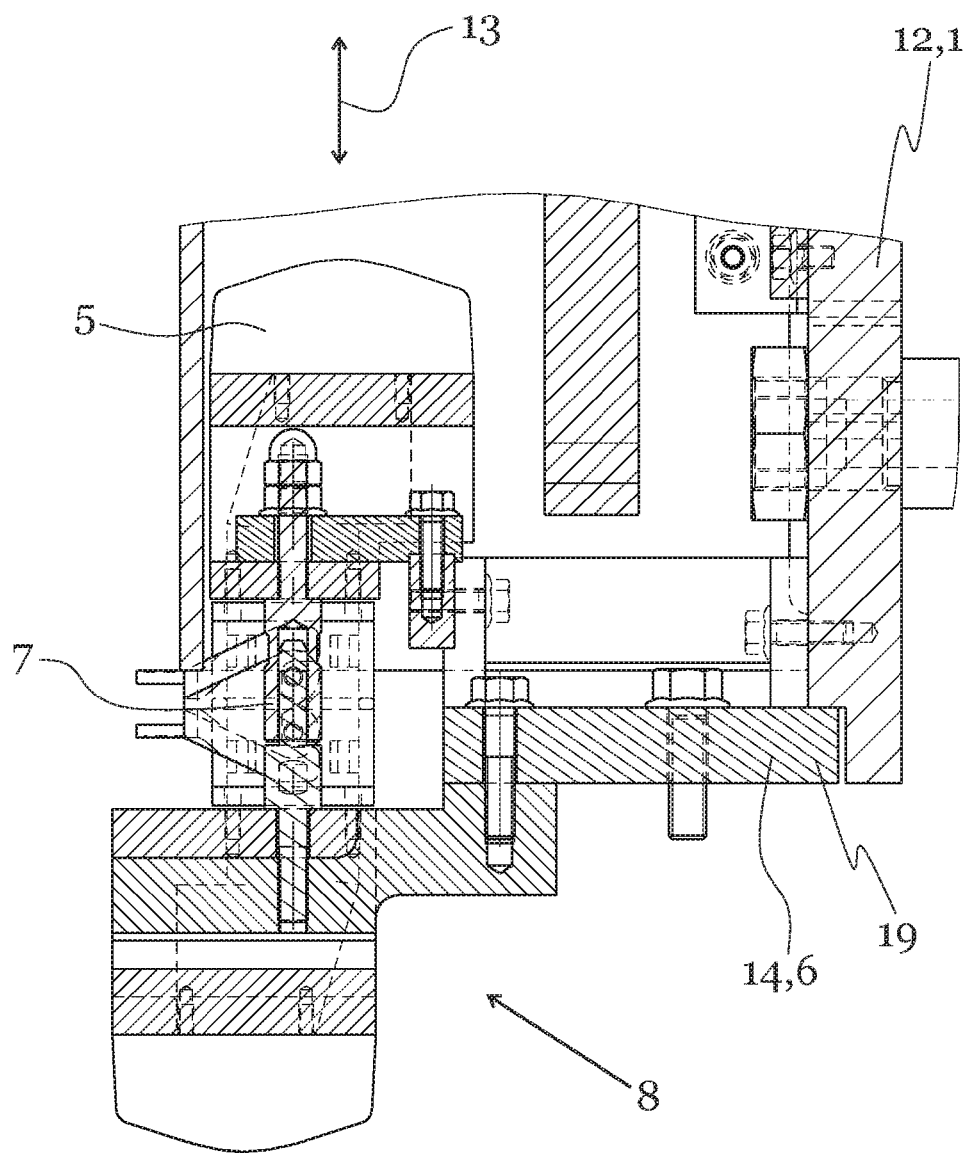
FIG. 2 shows a schematic sectional view of parts of the coupling system.

FIG. 2 shows details of the coupling system 8 in a schematic sectional view. A part of the machine frame 14 of the conveying apparatus 6 is connected in a centred or positionally centred manner to the cream coating head frame 12 of the cream coating head 1. The centring means 7 are in particular configured as a plug-in connection. In this case, preferably one of the connection partners comprises an extension and the other connection partner comprises a receptacle or a sleeve. The extension can be introduced into the sleeve where the two components have a fit with respect to one another so that a centring is accomplished. Preferably the connection partners have run-in slopes so that when the cream coating head 1 and the conveying apparatus 6 are inexactly combined, an automatic centring takes place. For example, the extension has a conical or rounded tip. Optionally the sleeve also has a conical expansion. This facilitates the centring of the components with respect to one another.

Furthermore, in order to support the components with respect to one another, a shoulder 19 can be provided on which the cream coating head 1 rests on the conveying apparatus 6 or on the machine frame 14. This shoulder can be height-adjustable, as shown in FIG. 1. As a result, the distance of the cream coating head 1 from the conveying surface 16 can be varied.

Figure 3:
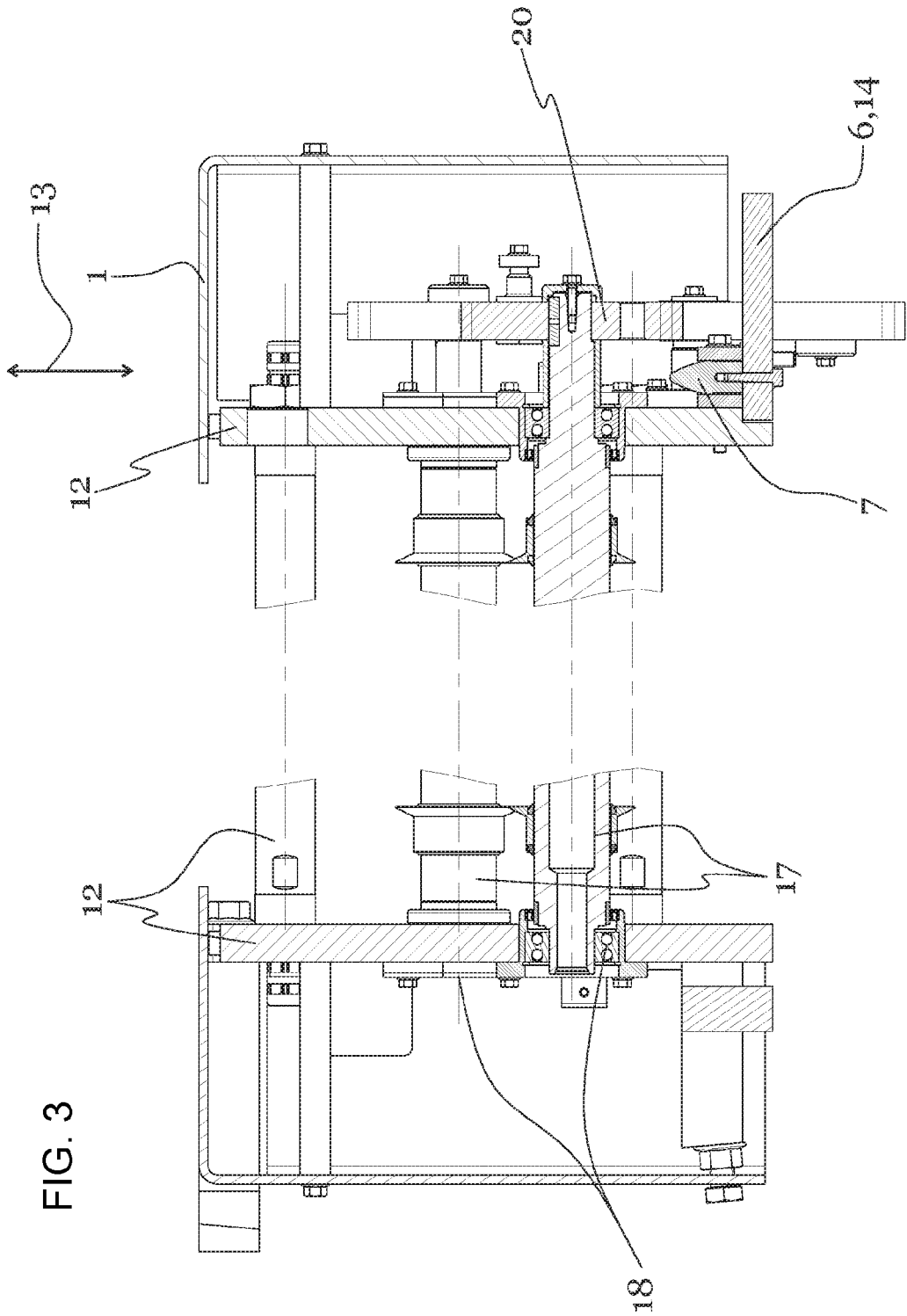
FIG. 3 shows a schematic sectional view of a detail of the apparatus according to the invention or the cream coating head according to the invention.

FIG. 3 shows a schematic sectional view through parts of the cream coating head 1 or the conveying apparatus 6. In particular, a centring means 7 is shown in cutaway view. In this, a mandrel which is rigidly connected to the machine frame 14 is inserted into a sleeve connected to the cream coating head 1. As a result, a lateral centring, in particular normal to the plug-in direction 13 is given. The cream coating head 1 comprises two cream rollers 17. These are preferably mounted laterally by bearings 18 and optionally driven by a drive not shown. In particular, a transmission 20 can also be provided by means of which the drive is connected to one or more cream coating rollers.

Preferably the drive is provided on the conveying apparatus 6 and is connected to the cream coating head 1 by means of a coupling such as for example a belt drive or a gear wheel. Optionally the drive is provided on the cream coating head frame 12. The energy for the drive is supplied in particular by means of connectors 9 and/or the medium connectors 10. Thus, electrical drives, pneumatic drives or hydraulic drives can be provided.

The cream coating head frame 12 optionally comprises side walls, stiffening elements by means of which the side walls are connected and optionally other supporting elements so that a self-supporting cream coating head frame 12 is formed.

Optionally a cover is provided which in particular covers the transmission and other components. As a result, escaping oil or other substances are prevented from contaminating the carrier body 2 or the cream.

Figure 4:
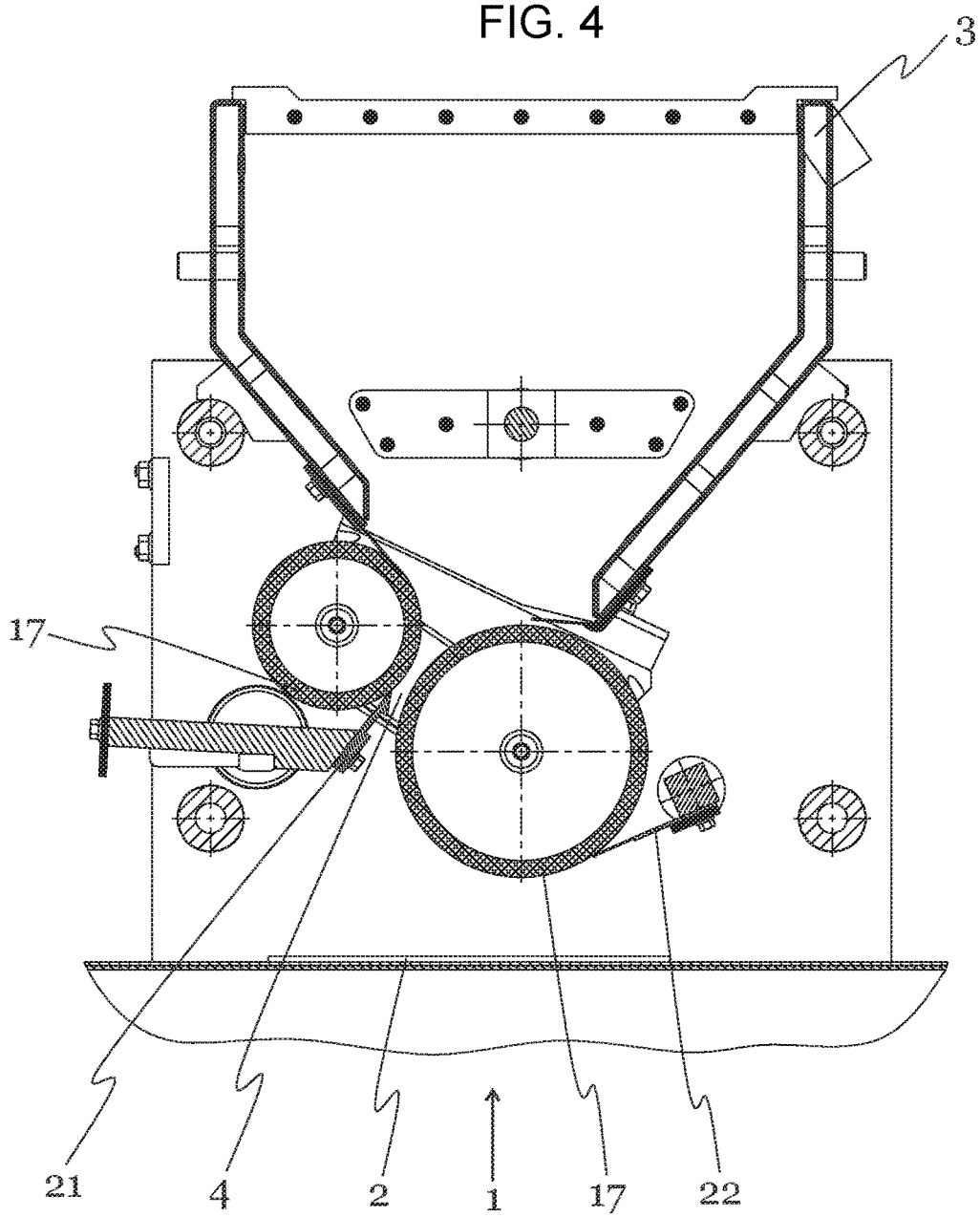
FIG. 4 shows a schematic sectional view of a cream coating head according to the invention.

FIG. 4 shows a schematic sectional view of a cream coating head 1. This comprises a cream container 3 which in particular can be configured to be funnel-shape. Optionally the cream is located in this cream container 3. Furthermore cream rollers 17 are provided. These cream rollers 17 are at a distance from one another, thereby forming a gap. Through this gap the cream can be transported in the direction of the carrier body 2. Furthermore a calibrating meter 21 is preferably provided. This calibrating meter 21 corresponds to a plate- or beam-shaped body which can optionally be inserted into the gap between the two cream rollers 17. By varying the position of the calibrating meter, the width of the cream gap 4 and as a result the thickness of the dispensed cream ribbon or the dispensed cream film can be adjusted. The movement of the calibrating meters 21 is accomplished, for example, manually or by means of a drive. The drive can, for example, by an electrical drive, a pneumatic drive and/or a hydraulic drive.

Furthermore, the cream coating head 1 according to the invention can comprises a scraper 22.

Optionally the cream rollers 17 and/or the cream container 3 are heated. This heating is accomplished for example by means of the supply of a liquid, heated heating medium such as in particular water into the interior of the rollers.

In all embodiments electrical energy and/or electrical signals can be transmitted via the connector or connectors 9. For example, the signal of a safety switch can be transmitted via a connector 9. For example, the apparatus according to the invention or the cream coating head 1 according to the invention can only be put into operation when all the parts are arranged as prescribed. For example, the cream container 3 must or should be placed correctly on the cream coating head 1. Optionally there are safety cover plates or safety switches which must be located in a predetermined position.

Preferably the apparatus and/or the cream coating head 1 can only be put into operation when all these safety switches are located in their release position. The signals of the safety switches can, for example, be [transmitted] via the connectors to the apparatus and in particular to the control device.

Optionally in all embodiments electrical energy for heating one or more components of the cream coating head 1 can be transmitted via a connector 9. For example, the calibrating meter 21 or other components, for example, also the rollers can be heated by means of an electrical heater. Optionally electrical energy is transmitted via a connector 9 for moving a stirrer or a paddle which are for example provided movably and driven in the cream container 3 in order to bring about a better through-mixing of the cream.

Optionally in all embodiments a medium is transmitted to the cream coating head 1 via a medium connector 10. This medium can for example be a heated liquid or a cooled liquid. By this means components of the apparatus and/or the cream coating head 1 can be cooled or heated. For example, the temperature of the cream coating roller 17 can be influenced by means of a water cooling or water heating. Optionally the container can also be heated or cooled. Optionally in all embodiments this medium connector 10 comprises a valve to prevent any escape of medium when the connector 9 is separated.

Optionally in all embodiment the calibrating meter 21 can be placed on one of the cream coating rollers 1. As a result, the calibrating meter 21 optionally acts as a scraper. In this embodiment the calibrating meter 21 is preferably placed in a linear or flat manner along a large part or along the entire length of the roller gap on a roller.

Optionally in all embodiments centring means 7 can act as register pins. For example a single register pin is provided which blocks at least two degrees of freedom of the cream coating head 1 with respect to the machine frame 14. A further centring can be achieved, for example, by blocking the twisting about this register-pin-shaped centring means 7. This is achieved, for example, by means of a type of key or by means of extensions which for example project into grooves. In order to avoid double fits, in all embodiments further centring means can be mounted at least partially in a floating or movable manner. For example, a centring in the form of centring means 7 is provided for centring the connectors with respect to one another. One of the connectors 9, one of the medium connectors 10 and/or a part of the centring means 7 can be mounted in a floating or slightly movable manner. This results in a centring of the connectors 9 with respect to one another without causing any wedging due to double fits. For example, a group of connection partners of one component (coating head or conveying apparatus) is provided on a plate which is configured to be movable to a certain extent, for example by 1 to 5 mm. The connection partners of the respectively other component are, for example, firmly connected to the frame. By plugging the cream coating head 1 on or onto the conveying apparatus 6, the connectors 9 and optionally the medium connectors 10 are centred with respect to one another. This centring is accomplished by means of the centring means 7.

Optionally in all embodiments the drive for rotating the cream rollers 17 can be disposed on the conveying apparatus 6 and/or on the machine frame 14 of the conveying apparatus 6. The rotation of this drive can be transmitted to the cream coating head 1 and in particular to the rollers by means of gear wheels, belts or similar transmission members.

Optionally in all embodiments vertically upwardly projecting extensions are provided on the machine frame 14 of the conveying apparatus. The length of these extensions or the height thereof can be varied, for example, by means of spindle mountings or screw connections. Optionally a body which comprises a shoulder on which the cream coating head 1 can be placed is provided on these extensions. The positioning of the cream coating head 1 with respect to the conveying surface 6 can be adjusted by means of this variable length or height of the extensions. In particular, the height of the cream coating head 1 can be varied.

Optionally in all embodiments the apparatus or the cream head can be part of a system. This system comprises at least one conveying apparatus 6 and at least two cream coating heads 1. This system makes it possible to exchange the cream coating head 1, where the system and/or the apparatus only needs to be stopped briefly. For example, as described above, the newly supplied cream coating head 1 can be cleaned or provided with a new cream. The apparatus according to the invention can accordingly optionally be characterized in that a system is provided comprising a conveying apparatus 6, a first cream coating head 1 and a second cream coating head 1 where preferably one cream coating head 1 is connected or can be connected to the conveying apparatus 6 and upon removing the first cream coating head 1, a second cream coating head 1 can be connected immediately thereafter to the conveying apparatus 6 and preferably can be plugged thereon. Preferably both cream coating heads 1 have the same arrangement and position of the centring means 7, the connectors 9 and/or the medium connectors 10. Both cream coating heads 1 preferably comprise a self-supporting cream coating head frame 12.

Optionally the coupling system 8 is used for coupling current and compressed air. The compressed air is optionally required for the calibrating meter 21 and/or for the pneumatic roller seal.

The cream coating head 1 is optionally placed simply on the system and is fixed in its position on the one hand by its own weight and on the other hand on both sides by the receiving recesses in the contact surface. A screw connection is preferably not provided in this case in particular since the cream coating head should be replaceable rapidly and without tools. Optionally however a pneumatic lock is provided.

In all embodiments the coupling arrangement 5 is a part of the coupling system 8.

REFERENCE LIST

1 Cream coating head
2 Carrier body
3 Cream container
4 Cream gap
5 Coupling arrangement
6 Conveying apparatus
7 Centring means
8 Coupling system
9 Connector
10 Medium connector
11 -
12 Cream coating head frame
13 Plug-in direction
14 Machine frame
15 Conveying means
16 Conveying surface
17 Cream rollers
18 Bearing
19 Shoulder
20 Transmission 21 Calibrating meter
22 Scraper

The invention claimed is:

1. An apparatus for applying a pumpable mass onto at least one carrier body or flat wafer, the apparatus comprising:
   a cream coating head for dispensing and applying a cream, a mass or a chocolate cream to the at least one carrier body or flat wafer to form an intermediate product or wafer sheets with an applied cream film to produce edible products or wafer blocks, said cream coating head including a cream container for receiving the cream to be dispensed, and an elongate cream gap disposed downstream of said cream container for dispensing a cream ribbon or a cream film;
   a conveying apparatus for conveying the at least one carrier body or flat wafer, said conveying apparatus having a machine frame and a driven conveying device disposed on said machine frame; and
   a detachable coupling system including a coupling configuration for coupling said cream coating head to and decoupling said cream coating head from said conveying apparatus, said coupling configuration including a connector for transferring at least one of electrical energy or electrical signals.

2. The apparatus according to claim 1, wherein said driven conveying device is a conveyor belt or a belt conveyor, and said machine frame is configured to stand on the ground.

3. The apparatus according to claim 1, wherein said coupling system includes at least one centering device for centering and fixing a position of said cream coating head relative to said conveying apparatus, and said at least one centering device includes two connection partners to be connected to one another or separated from one another along a plug-in direction.

4. The apparatus according to claim 3, wherein one of said connection partners is permanently connected to said conveying apparatus and the other of said connection partners is permanently connected to said cream coating head.

5. The apparatus according to claim 1, wherein said connector includes two connection partners to be connected to one another or separated from one another along a plug-in direction.

6. The apparatus according to claim 5, wherein one of said connection partners is permanently connected to said conveying apparatus and the other of said connection partners is permanently connected to said cream coating head.

7. The apparatus according to claim 1, wherein said coupling system includes a medium connector for connection to a medium line, a compressed air line or a liquid line, said medium connector is a sealing medium connector for connecting two of said lines, and said medium connector includes two connection partners to be connected to one another or separated from one another along a plug-in direction.

8. The apparatus according to claim 7, wherein one of said connection partners is permanently connected to said conveying apparatus and the other of said connection partners is permanently connected to said cream coating head.

9. The apparatus according to claim 3, wherein:
   said at least one connector includes two connection partners to be connected to one another or separated from one another along a plug-in direction;
   said centering device and said at least one connector are provided in a predetermined configuration on said cream coating head and on said conveying apparatus; and
   said centering device and said at least one connector have an identical plug-in direction permitting said centering device and said at least one connector to be connected to said respective connection partners for plugging-on or placement of said cream coating head on said conveying apparatus and for making a ready-to-operate connection between said cream coating head and said conveying apparatus.

10. The apparatus according to claim 9, wherein:
    said coupling system includes at least one medium connector for connection to a medium line, a compressed air line or a liquid line, said at least one medium connector is a sealing medium connector for connecting two of said lines, and said at least one medium connector includes two connection partners to be connected to one another or separated from one another along a plug-in direction;
    said at least one medium connector is provided in a predetermined configuration on said cream coating head and on said conveying apparatus; and
    said at least one medium connector has said plug-in direction permitting said at least one medium connector to be connected to said respective connection partners for plugging-on or placement of said cream coating head on said conveying apparatus and for making said ready-to-operate connection between said cream coating head and said conveying apparatus.

11. The apparatus according to claim 10, wherein:
    said conveying apparatus or said conveying device has a conveying surface; and
    said plug-in direction runs at least one of transversely to said conveying surface, normal to said conveying surface or substantially vertical or perpendicular permitting said cream coating head disposed above said conveying surface to be raised upwards.

12. The apparatus according to claim 1, wherein said coupling system is mountable without tools or said coupling system is separable and connectible without tools.

13. The apparatus according to claim 1, which further comprises a locking apparatus for locking said cream coating head to said conveying apparatus.

14. A cream coating head for dispensing and applying a cream, a mass or a chocolate cream to a carrier body or a flat wafer moving on a conveying apparatus to form an intermediate product or wafer sheets with an applied cream film to produce edible products or wafer blocks, the cream coating head comprising:
    a cream container for receiving the cream to be dispensed;
    an elongate cream gap disposed downstream of said cream container for dispensing a cream ribbon or a cream film; and
    a coupling configuration for coupling the cream coating head to the conveying apparatus, said coupling configuration including a connector for transferring at least one of electrical energy or electrical signals.

15. The cream coating head according to claim 14, wherein said coupling configuration includes at least one centering device for centering and fixing a position of the cream coating head relative to the conveying apparatus.

16. The cream coating head according to claim 14, wherein said coupling configuration includes a medium connector for connection to at least one medium line, at least one compressed air line or at least one liquid line, said medium connector being a sealing medium connector for connecting two of said lines optionally with a valve.

17. The cream coating head according to claim 14, which further comprises a self-supporting cream coating head frame to which components of the cream coating head are connected to permit the cream coating head to be separated and removed in a modular manner from the conveying apparatus.

18. The cream coating head according to claim 15, wherein:
said centering device and said at least one connector having an identical plug-in direction permitting said centering device and said at least one connector to be connected to respective connection partners by pushing-on or placing the cream coating head onto the conveying apparatus.

19. The cream coating head according to claim 18, wherein:
said coupling configuration includes at least one medium connector for connection to at least one medium line, at least one compressed air line or at least one liquid line, said at least one medium connector being at least one sealing medium connector for connecting two of said lines optionally with a valve; and
said at least one medium connector having said plug-in direction permitting said at least one medium connector to be connected to a connection partner by pushing-on or placing the cream coating head onto the conveying apparatus.

20. A system, comprising:
an apparatus for applying a pumpable mass onto at least one carrier body or flat wafer, said apparatus including at least two cream coating heads for dispensing and applying a cream, a mass or a chocolate cream to the at least one carrier body or flat wafer to form an intermediate product or wafer sheets with an applied cream film to produce edible products or wafer blocks, said at least two cream coating heads each including a cream container for receiving the cream to be dispensed, and an elongate cream gap disposed downstream of said cream container for dispensing a cream ribbon or a cream film;
a conveying apparatus for conveying the at least one carrier body or flat wafer, said conveying apparatus having a machine frame and a driven conveying device disposed on said machine frame; and
a detachable coupling system including a coupling configuration for coupling one of said at least two cream coating heads to and decoupling one of said cream coating heads from said conveying apparatus;
said cream coating heads being configured to be alternately plugged onto said conveying apparatus permitting one of said cream coating heads to be separated and removed from said conveying apparatus and another of said cream coating heads to be connected to said conveying apparatus immediately thereafter in an identical same location.

* * * * *